United States Patent
Bruce (12)

(10) Patent No.: US 6,508,147 B1
(45) Date of Patent: Jan. 21, 2003

(54) EARTH WORKING SWEEP

(76) Inventor: Douglas G. Bruce, 2223 Fourth St., Perry, IA (US) 50220

( * ) Notice: Subject to any disclaimer, the term of this patent is extended or adjusted under 35 U.S.C. 154(b) by 0 days.

(21) Appl. No.: 09/519,020

(22) Filed: Mar. 3, 2000

Related U.S. Application Data

(63) Continuation-in-part of application No. 09/378,951, filed on Aug. 23, 1999.

(51) Int. Cl.$^7$ .............................................. A01B 39/20
(52) U.S. Cl. ............................. 76/113; 29/14; 29/412; 172/721; 172/730; 172/765
(58) Field of Search .............................. 76/113, 104.1; 29/14, 412, 417; 172/721, 730, 732, 733, 765, 770, 771

(56) References Cited

U.S. PATENT DOCUMENTS

| | | | | |
|---|---|---|---|---|
| 97,162 A | * | 11/1869 | Caldwell | 172/730 |
| 104,754 A | * | 6/1870 | Miner | 172/730 |
| 199,590 A | * | 1/1878 | Speer | 172/730 |
| 769,055 A | * | 8/1904 | Bumgardner | 172/770 |
| 1,639,593 A | * | 8/1927 | Dean | 172/733 |
| 1,931,234 A | * | 10/1933 | Moseley | 29/415 |
| 2,047,293 A | * | 7/1936 | Schumacher | 29/14 |
| 2,813,278 A | * | 11/1957 | Stecher | 16/430 |
| 3,923,104 A | * | 12/1975 | Tibbs | 172/730 |
| 5,172,770 A | * | 12/1992 | Moyle | 172/732 |
| 5,176,209 A | * | 1/1993 | VandenBrink | 172/770 |
| 5,259,461 A | * | 11/1993 | Cochrane | 172/730 |
| 5,730,228 A | * | 3/1998 | Mansur | 172/730 |
| 5,752,407 A | * | 5/1998 | Becker et al. | 29/14 |
| 6,119,321 A | * | 9/2000 | Bruce | 29/14 |
| 6,120,827 A | * | 9/2000 | Rocca | 426/503 |

* cited by examiner

*Primary Examiner*—Allan N. Shoap
*Assistant Examiner*—Thomas J Druan, Jr.
(74) *Attorney, Agent, or Firm*—Henderson & Sturm LLP

(57) ABSTRACT

The present invention has several aspects to it, one of which is the provision of a chisel point which is straight and tapered from its thinnest part at the extreme front to a thicker part at the rear thereof for causing a sweep to wear longer than prior art sweeps. This sweep also improves soil penetration and is self-sharpening. Another aspect of the present invention is to provide an earth working sweep having a front end, a right side, a left side, and a central upper portion for connecting the sweep to an implement. It also has a right rear wing portion and a left rear wing portion with an intermediate portion connecting the front end to the central upper rear portion and the left and right rear wing portions. A right edge and a left edge have concave edges on the front and convex edges on the back so as to form a somewhat S-shaped configuration which reduces scrap when being made and adds to the longevity and performance of the sweep. Another aspect of the present invention is a method of making a ground engaging sweep from a sheet of metal which has two parallel sides, a first end and a second end. The edges of the sweep are cut so that the right side of one sweep is a mirror image of the left side of the next adjacent sweep so that no material is wasted therebetween as they are cut from one sheet of material. By using this method, as much metal as possible is utilized in the sweep itself rather than having wasted metal as scrap and thereby enhancing the life and performance of such sweep.

8 Claims, 4 Drawing Sheets

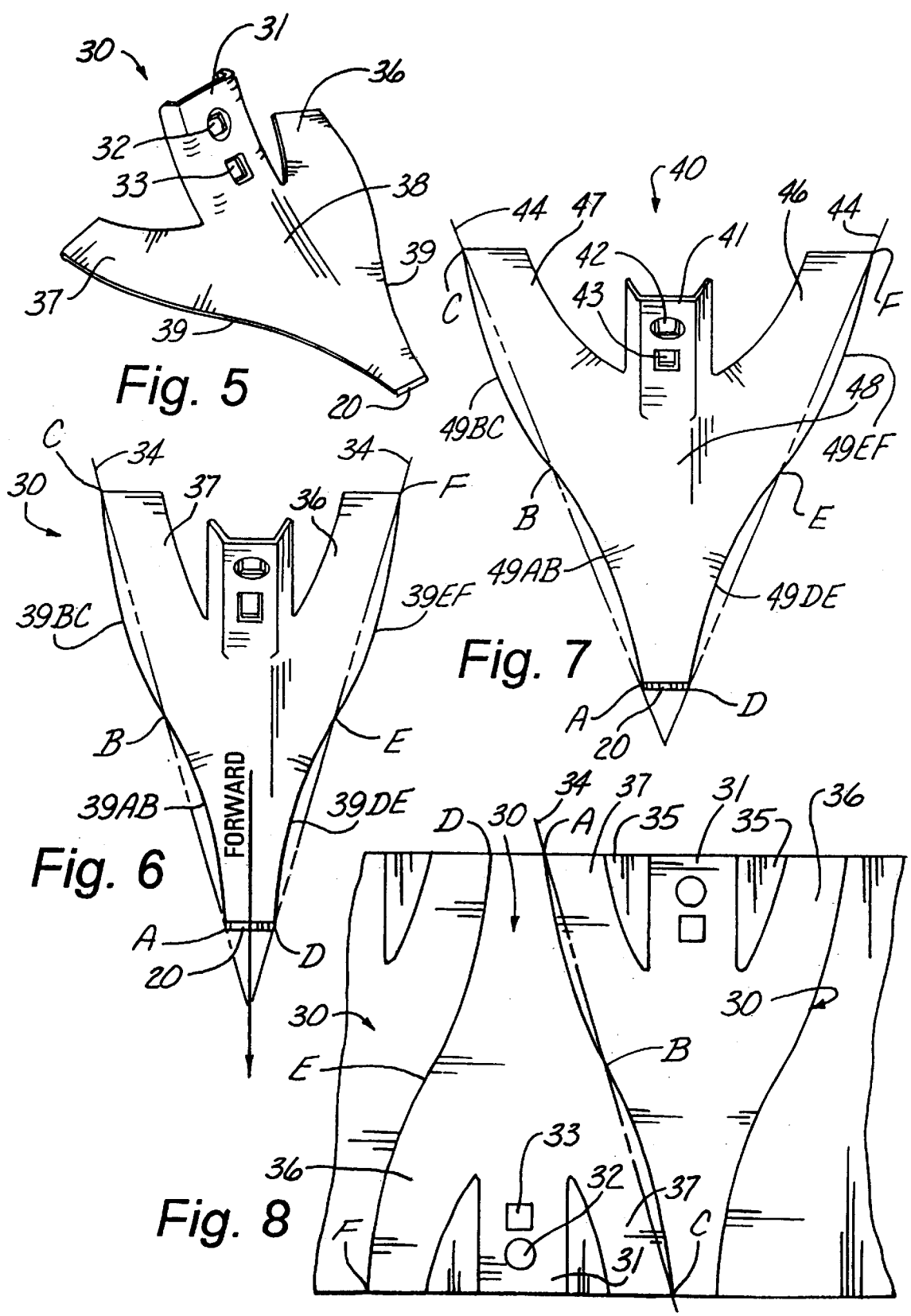

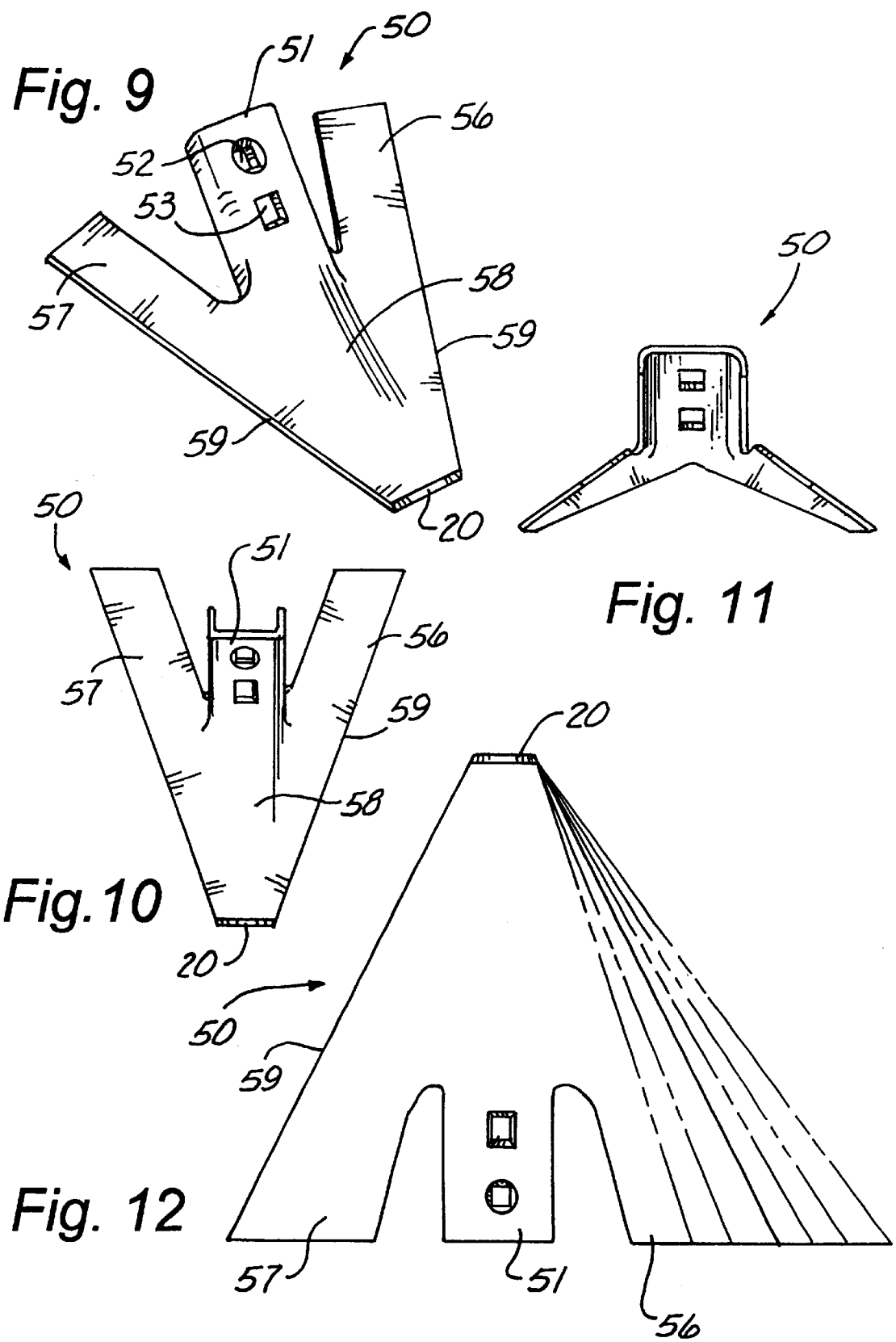

EARTH WORKING SWEEP

CROSS-REFERENCE TO RELATED APPLICATIONS

This is a continuation-in-part application of U.S. Ser. No. 09/378,951, filed Aug. 23, 1999 by Douglas G. Bruce, and entitled METHOD OF MAKING AN EARTH TILLING SWEEP FROM DISC SCRAP

STATEMENT REGARDING FEDERALLY SPONSORED RESEARCH OR DEVELOPMENT

Not Applicable.

MICROFICHE APPENDIX

Not Applicable.

BACKGROUND OF INVENTION

1. Field of the Invention

The present invention relates generally to an earth working sweep and more particularly to one primarily used for agricultural purposes and also to a method of making sweeps.

2. Description of Prior Art

Prior art sweeps are mostly of the shape shown in FIG. 4. A problem with prior art sweeps is that they wear out too quickly. Another problem with the prior art is that in the process of constructing prior art sweeps, too much metal is scrap and therefore there is a problem of too much wasted material.

BRIEF SUMMARY OF THE INVENTION

The present invention has several aspects to it, one of which is the provision of a chisel point which is straight and tapered from its thinnest part at the extreme front to a thicker part at the rear thereof for causing a sweep to wear longer than prior art sweeps. This sweep also improves soil penetration and is self-sharpening. Another aspect of the present invention is to provide an earth working sweep having a front end, a right side, a left side, and a central upper portion for connecting the sweep to an implement. It also has a right rear wing portion and a left rear wing portion with an intermediate portion connecting the front end to the central upper rear portion and the left and right rear wing portions. A right edge and a left edge have concave edges on the front and convex edges on the back so as to form a somewhat S-shaped configuration which reduces scrap when being made and adds to the longevity and performance of the sweep.

Another aspect of the present invention is a method of making a ground engaging sweep from a sheet of metal which has two straight sides, a first end and a second end. The edges of the sweep are cut so that the right side of one sweep is a mirror image of the left side of the next adjacent sweep so that no material is wasted therebetween as they are cut from one sheet of material. By using this method, as much metal as possible is utilized in the sweep itself rather than having wasted metal as scrap. This also enhances the life and performance of such sweep.

An object of the present invention is to provide an improved sweep and an improved method of making sweeps.

Another object of the present invention is to provide a longer wearing sweep and, because it lasts longer, it is more economical to use.

Another object of the present invention is to reduce the waste associated with making sweeps, thereby giving as much of the metal from which the sweeps are made to the farmer and thereby reducing the amount of scrap.

A further object is to provide a chisel point on a sweep.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 5 is a perspective view of another preferred embodiment of the present invention showing a sweep with S-curved edges;

FIG. 6 is a top view of the FIG. 5 embodiment and showing how the front edge is concave and the rear edge is convex on each side and having a chisel point;

FIG. 7 is another embodiment of the present invention but being wider at the rear than the FIGS. 5 and 6 embodiment;

FIG. 8 is a top view of a sheet metal having the outline of the sweep of FIGS. 5 and 6 drawn thereon to show how much of the metal is utilized and how much is converted into scrap material;

FIG. 9 is still another embodiment of the present invention shown in a perspective view;

FIG. 10 is a top view of the embodiment of FIG. 9;

FIG. 11 is a rear view of the embodiment of FIG. 9;

FIG. 12 is a top view of the embodiment of FIG. 9 when it is flat, before it is bent to the shape of FIGS. 9–11 and also showing how it can have winged members which are wider or narrower, depending upon the desire of the user thereof.

DETAILED DESCRIPTION OF THE INVENTION

Figure 1:
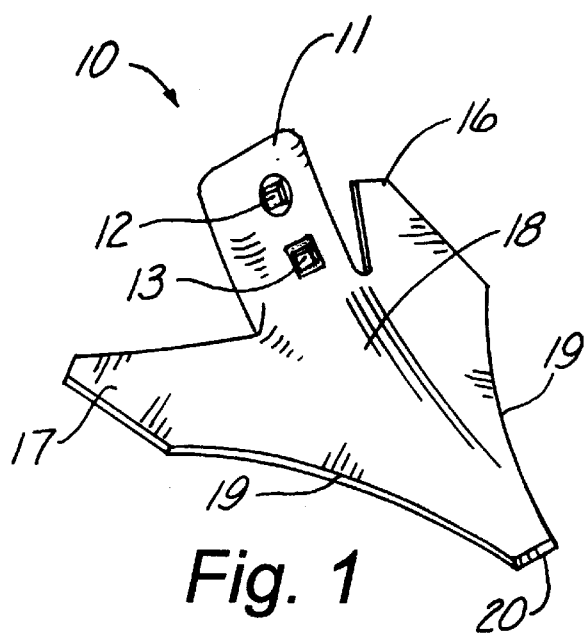
FIG. 1 is a perspective view of a preferred embodiment of the present invention showing a chisel point.
Figure 2:
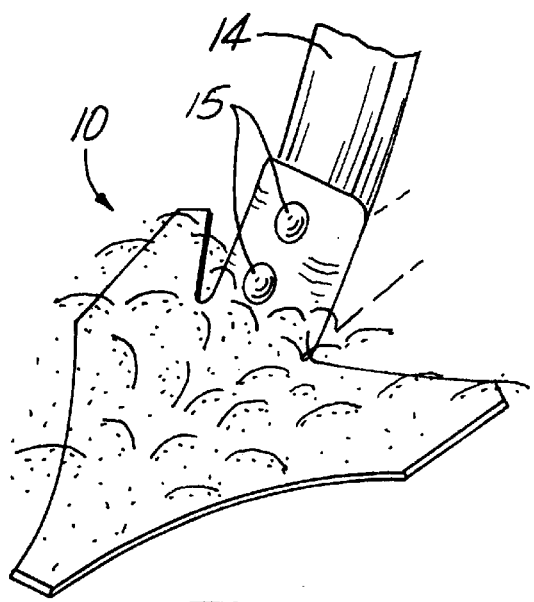
FIG. 2 is another perspective view from a different angle showing the sweep of the present invention attached to a shank of an earth working implement and showing how it moves to till the soil, the soil being shown by lines and dots in FIG. 2.

Referring now to the drawings wherein like reference numerals designate identical or corresponding parts throughout the several views, FIG. 1 shows a sweep (10) constructed in accordance with the present invention and being substantially identical to the sweep disclosed in U.S. patent application Ser. No. 09/378,951, now U.S. Pat. No. 6,119,321, which is incorporated herein by reference, The sweep (10 has a shank portion (11) with holes (12) and (13)

therein for allowing it to be attached to a shank (14) with bolts (15) as shown in FIG. 2. A left rear wing (16) and a right rear wing (17) are connected by an intermediate portion (18).

Figure 3:
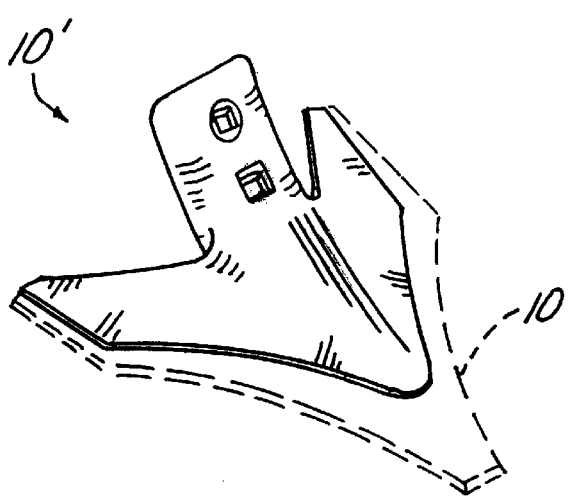
FIG. 3 is a perspective view like FIG. 1 and showing the wear pattern of the sweep of FIG. 1 with the dashed lines showing the sweep as it is initially used and the solid lines after it has been used and not quite to the point where it is worn out.
Figure 4:
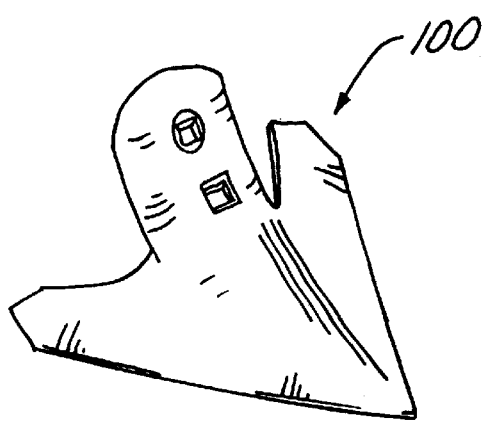
FIG. 4 is a perspective view of a typical prior art sweep noting that the shape to which it is formed initially is close to the shape that the FIG. 1 sweep is as shown in solid lines in FIG. 3, after it has become worn.

Concave edges (19) taper forwardly to a chisel point (20) which is at least ½ inch wide from one side to the other side and which is tapered in thickness from having practically no thickness at the extreme front thereof to a rear portion thereof which is substantially the same thickness as the plate from which the entire sweep is constructed. It has been determined empirically that the sweep (10) has approximately three times the life of a sweep (100) as shown in FIG. 4 of the prior art, and that the sweep (10) gradually wears from the original shape shown in FIG. 3 in dashed lines to the condition (10') shown in solid lines in FIG. 3. It can therefore be appreciated from this example that having a chisel point (20) and having more material in the sweep itself enhances the life and performance of the sweep (10).

Referring now to FIG. 5, a sweep (30) has a central upper rear shank portion (31) with holes (32) and (33) for receiving bolts, not shown, on a shank (14) similar to FIG. 2. The sweep (30) has a left rear wing portion (36) and a right rear wing portion (37) connected to an intermediate portion (38) and chisel point (20) substantially like the chisel point shown in FIG. 1. FIGS. 6–8 show points A, B, C, D, E, and F. The edges (39) of the sweep (30) extend through a straight line (34) during the construction of the sweep whereby a segment from point A to B form a concave portion (39AB) and a convex portion (39BC) wherein the length of (39AB) and (39BC) is the same and the shape is essentially an inverted mirror image. Similarly, the shape of edges (39DE) and (39EF) are substantially the same length and are essentially a mirror image of each other because they are cut from a single sheet of material as shown in FIG. 8 Consequently, the sweep (30) can be cut with very little wasted material, the wasted material primarily being the parts (35) between the wings (36) and (37) and the central upper rear shank portion (31).

In FIGS. 5–8, the sweeps (30) and (40) have a continuous radius of curvature from point A to point C and from point D to point F. A continuous radius of curvature is a line that cannot be defined as linear anywhere along a defined concave or convex part, and furthermore contains no point of discontinuity such as a cusp.

It is also possible to practice this invention by reversing the relationship of the concave and convex edges. In such relationship (not shown in the drawings), die edges (39) of the sweep (30) would still extend through a straight line (34) during the constriction of the sweep whereby the segment from point A to B form a convex (39AB) (instead of a concave portion) and a concave portion (39BV) (instead of a convex portion) wherein the length of (39AB) and (39BC) is the same and the shape is essentially an inverted mirror image. Similarly, the shape of edges (39DE) and (39EF) would be substantially the same length and are essentially a mirror image of each other but edge (39DF) would be the convex portion (instead of the concave portion shown in FIGS. 6–8) aud edge (39EF) would be the concave portion (instead of the convex portion shown in FIGS. 6–8). In this alternate arrangement the sweeps would still be cut from a single sheet of material.

FIG. 7 shows a sweep (40) constructed substantially like the sweep (30) of FIG. 5 except that lines (44) are formed at a greater angle so that they diverge more quickly from the point to the rear of the sweep (40) to provide a wider sweep but one which still has edges which have convex portions (49AB) and (49DE) and convex portions (49BC) and (49EF) which have the same essential relationships as the FIG. 5 sweep wherein the length of the convex edges are the same as the concave edges and are of substantial mirror images thereof. It being therefore understood that when making a sweep of this type using the FIG. 8 example, that the lines (34) or (44) could be substantially any angle greater or less than these two examples and still fall within the scope of the present invention. FIG. 7 also has an intermediate part (48) and a central upper rear shank (41) with holes (42) and (43) therein. It also has wings (46) and (47).

Figure 13:
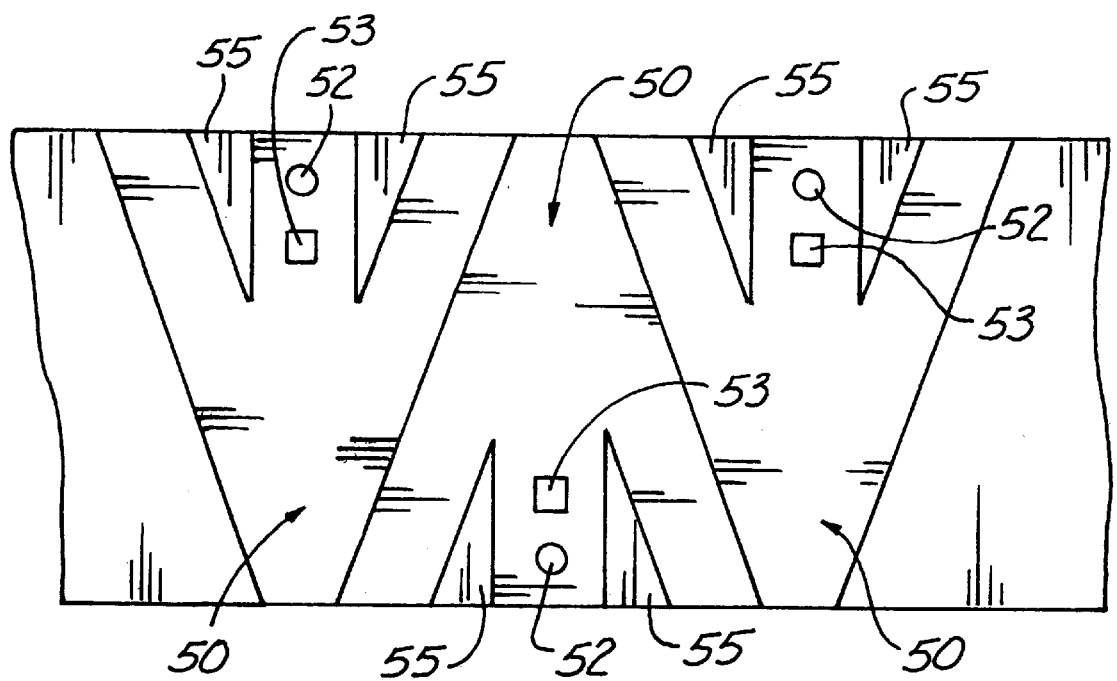
FIG. 13 is a view of a flat sheet of metal having the outline of the sweep of FIG. 9 thereon before it is cut out, also showing how much of the sheet of metal is utilized for the sweep and how much will end up to be scrap.

Referring now to FIGS. 9–13, another embodiment of the present invention (50) is shown in FIG. 9 having a trapezoidal shape when referring especially to FIG. 13. The sweep (50) shown in FIG. 9 still has a chisel point (20) like all of the other sweeps disclosed herein. The sweep (50) has a central upper rear shank portion (51) with holes (52) and (53) therein for attachment to an earth working shank (14) as shown in FIG. 2. The sweep (50) has a left rear wing (56) and a right rear wing (57) with an intermediate portion (58) leading to two straight sides (59) which extend forwardly to the chisel point (20).

Looking to FIG. 13, it is noted that the sweeps (50) can be cut from a rectangular sheet of material utilizing nearly all of the material within the sheet except for parts (55) and where the holes (52) and (53) are formed.

Referring to FIG. 12, it is noted that the sweep can be as wide or narrow as desired by the user as indicated by sizes (7), (8), (9), (10), (11) and (12) in FIG. 12. The sweep (50) in FIG. 12 has the right side in solid lines because the size (9) has been chosen, but if any of the other sizes shown in dashed lines are chosen, that chosen shape would merely be superimposed on the sheet of metal in FIG. 13 and a number of the chosen sized sweeps can then be cut from a single sheet of metal in order to conserve the metal, reduce waste and give the farmer as much metal as possible in order to enhance the performance and longevity of the sweep to be made therefrom.

Accordingly it will be appreciated that the preferred embodiments shown herein do indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of making ground engaging sweeps from a sheet of metal which has two straight sides, a first end and a second end, said sweeps having a front end and a rear end, the rear end being substantially wider than said front end, a right side edge and a left side edge, said method comprising:

cutting the adjacent side edges of said sweeps in an S-shape along a line on said sheet of metal between adjacent sweeps so that the cutting is done between the front right side edge of said one sweep and the front right side edge of the next adjacent sweep and the right and left side edges of each sweep are closer together at the front end thereof than at the back end thereof whereby substantially as much of the metal as possible is used to make said sweeps wherein said edges of said sweeps comprise making a concave edge portion and a convex edge portion, wherein said concave edge portions are made with a continuous radius of curvature and wherein said convex edge portions are made with a continuous radius of curvature which is the same radius of curvature as said concave edge portions, and wherein each of said convex and concave edge portions are made to be of substantially the same length.

2. The method of claim 1 wherein said concave edge portion on each side of one of the sweeps are made to connect directly with the convex edge portion on a respective side of said one sweep.

3. The method of claim 2 wherein an extreme front portion of each of said sweeps is straight and disposed substantially perpendicular to the intended direction of forward direction of said sweeps in use.

4. The method of claim 3 including making said extreme front portion into a chisel point by tapering it so that it is thicker at the rear portion thereof than at the front thereof.

5. The method of claim 1 wherein said sweeps are cut from a sheet of metal which is flat.

6. The method of claim 5 wherein said sweeps are bent so that at any place along the longitudinal center thereof on at least the rear half of each sweep, the edge portions directly outwardly therefrom are lower than said place on the longitudinal center.

7. The method of claim 1 further comprising forming a shank attachment section on the rear end of each one of said sweeps so that each of the sweeps can be attached to a downwardly extending shank of an earth working implement.

8. The method of claim 1 further comprising said concave edge portion being cut on the front portion of said sweep and the convex edge portion being cut on the rear portion of the sweeps during said cutting of the edges of the sweeps.

* * * * *